Patented Dec. 31, 1940

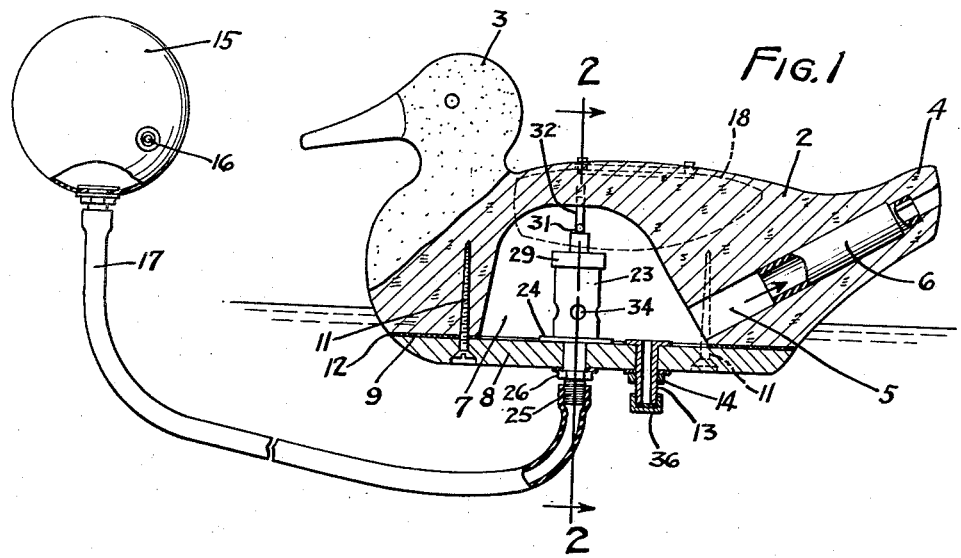
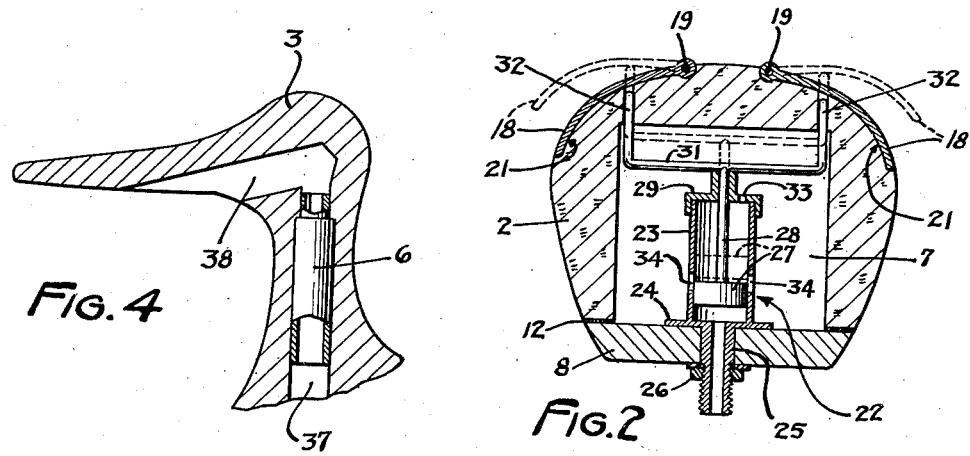
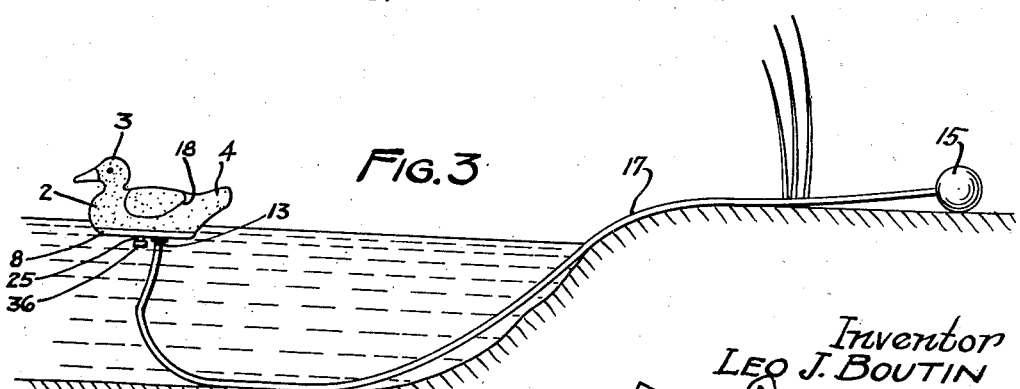

2,227,242

UNITED STATES PATENT OFFICE 2,227,242

DECOY

Leo J. Boutin, Minneapolis, Minn.

Application April 28, 1938, Serial No. 204,752

3 Claims. (Cl. 43—3)

This invention relates to new and useful improvements in decoys, such as are made in the form of ducks, geese, and other waterfowl, and are used by hunters and sportsmen for attracting wild game birds, and an object of the invention is to provide a decoy which will have a greater attraction to wild ducks, geese, and other fowl, than similar devices now commonly used.

A further object of the present invention is to provide a decoy having a duck call embodied therein and provided with means whereby the duck call may be operated from a blind or other station located remote from the decoy.

A further object is to provide a decoy comprising a body portion having an expansion chamber therein, and a duck call communicating with said chamber, and an elongated, flexible element having one end communicating with said chamber and provided at its opposite end with means for operating the duck call, and whereby the latter may be operated from a station located remote from the decoy.

A further object is to provide a decoy comprising a body portion provided with suitable wing elements and a duck call, and having means whereby said wing elements and duck call may be operated from a point remote from the decoy.

Other objects of the invention reside in the novel arrangement of the duck call in the body of the decoy; in the provision of the expansion chamber into which the air is delivered under pressure, and whereby the sound emanating from the duck call will be more natural than is possible to produce with an ordinary duck call; in the provision of a decoy having wing elements and a pneumatic duck call which may be operated simultaneously by a single operating device; in the provision of means whereby the wing elements and pneumatic call may be operated independently of one another; and, in the simple and inexpensive construction of the duck call and the means for operating it, and whereby these parts may readily be embodied in the construction of conventional decoys.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a longitudinal sectional view showing the invention embodied in a decoy;

Figure 2 is a cross-sectional view on the line 2—2 of Figure 1, showing the arrangement of the wing elements and the means for operating them;

Figure 3 is a view illustrating the means for operating the duck call from a blind or station located remote from the decoy; and Figure 4 is a detail sectional view showing a construction wherein the duck call is located in the neck or head portion of the decoy.

The novel decoy herein disclosed is shown comprising a body portion 2 of more or less conventional shape and design, made of a suitable buoyant material such, for example, as cork, whereby it will readily float upon the surface of the water. The body 2 is shown provided at one end with the usual head 3 and has a tail 4 at its opposite end shown provided with a bore 5 adapted to receive a pneumatic duck call, generally indicated by the numeral 6. This duck call comprises the usual reed, not shown, and is of more or less standard construction, and it is therefore thought unnecessary to further describe the same in detail. It is operated by passing or forcing air through it in the direction indicated by the arrow in Figure 1.

The body 2 is shown provided with an expansion chamber 7 which communicates with the bore 5. The lower wall 8 of the chamber 7 is in the form of a suitable plate which is detachably secured to the lower surface 9 of the body 2 by suitable means, such as screws 11. A suitable gasket 12 is interposed between the plate 8 and the surface 9 to provide a leak-tight joint therebetween. A suitable nipple 13 is provided in the plate 8 and is secured therein by suitable means, such as a nut 14.

The means for operating the duck call 6 is shown comprising a rubber ball or member 15 provided with a suitable check valve 16, and having one end of a rubber hose 17 connected thereto, the opposite end of which may be connected to the nipple 13, as shown in Figure 3. When the ball 15 is compressed, air is forced into the expansion chamber 7 and through the bore 5 and duck call 6, whereby the latter is operated, as will readily be understood. By the provision of the chamber 7, the air delivered or forced through the hose 17 will expand as it enters the chamber 7 and thereby operate the reed in the duck call 6 in such a manner as to produce a more natural sound. The hose 17 may be of any suitable length and provides means whereby the decoy may be operated from a blind located a considerable distance from the decoy, as shown in Figure 3.

To render the decoy more life-like in appearance, and to make it more attractive to wild birds, it may be provided with suitable wing elements 18 pivoted at 19 to the body 2. Suitable recesses 21 may be provided in the body 2 for receiving the wing elements 18, when in their normal positions, shown in full lines in Figure 2, but this is not necessary.

The means provided for operating or flapping the wing elements 18, is shown comprising a piston device, generally indicated by the numeral 22. This piston device is shown comprising a cylinder 23 having a flange 24 at its lower end seated against the plate 8 and having a nipple 25 received in an aperture provided in said plate. The lower end of the nipple 25 may be threaded to receive a nut 26 for securing the cylinder in the position shown in Figure 2.

A piston 27 is mounted for reciprocal movement within the cylinder 23 and has a rod 28 guidingly supported in a cap 29, secured to the upper end of the cylinder. The piston rod 28 is shown provided at its upper end with a suitable cross arm 31, having upright end portions 32 slidably received in guide openings provided in the upper portion of the body of the decoy. The terminals of the end portions 32 are adapted to engage the wing elements 18 and move them upwardly to the dotted line positions, shown in Figure 2.

One end of the hose 17 may be connected to the nipple 25 of the cylinder 23, as shown in Figure 1, whereby when the ball 15 is compressed, air under pressure will be introduced into the lower end of the cylinder 23, whereby the piston 27 is moved upwardly in the cylinder, with the result that the upper terminals of the end portions 32 of the cross arm 31 will engage the wing elements 18 and move them upwardly to the dotted line positions shown in Figure 2. A flapping action may readily be imparted to the wing elements by successively squeezing the rubber ball 15 in rapid succession. A suitable vent hole 33 is provided in the cap 29 to permit free circulation of air into and out of the cylinder 23 above the piston, when the latter is operated.

In some instances, it may be desired to operate the wings and duck call simultaneously. To permit the wing elements and duck call to be thus operated simultaneously, suitable apertures 34 are shown provided in the wall of the cylinder 23 at an elevation whereby the air delivered into the cylinder below the piston will escape through said apertures, when the wing elements reach substantially the dotted line positions shown in Figure 2. Thus, each time the piston is operated to actuate the wing elements, the air delivered into the cylinder below the piston will discharge into the expansion chamber 7 through the apertures 34, from whence it will escape to the atmosphere through the bore 5 and duck call 6, whereby the latter is actuated, as will readily be understood.

By providing two nipples 13 and 25, as shown in Figure 1, the wing elements may be operated simultaneously with the duck call 6, when the hose is attached to the nipple 25, as shown in Figure 1. When the hose is attached to the nipple 13, the duck call only will be operated, and the wing elements will remain in their normal full line position, shown in Figure 2. When the hose is attached to the nipple 13, the cap 36 which normally closes the nipple 13 is removed from nipple 13 and secured to nipple 25 to seal the lower end thereof.

In Figure 4 there is shown a construction wherein the duck call 6 is located in a bore 37 provided in the neck of the decoy. The upper end of the duck call communicates with an air passage 38 provided in the lower portion of the head 3 of the decoy, and through which the air discharging through the decoy may escape to the atmosphere.

The novel decoy herein disclosed, is very simple in construction. By referring to Figure 1, it will be noted that the duck call 6 may readily and inexpensively be embodied in the body of the decoy, and if the wing elements are omitted, as may be desirable in some cases, the piston device 22 is also dispensed with, and only one nipple is provided in the plate 8 for attaching the hose thereto.

From actual experience, I have found that the novel decoy herein disclosed is more attractive to wild birds than ordinary conventional decoys which do not have a duck call embodied directly in the body thereof. By means of the flexible connection or hose 17, the hunter or sportsman may station himself in a blind with the decoy placed on the surface of the water a considerable distance from him. The hose 17 may also serve as an anchor for the decoy to prevent it from drifting. It also provides means whereby the hunter may readily retrieve the decoy without the use of a boat. The duck call and wings may be operated at will by the simple manipulation of the rubber ball 15.

From actual experience, I have found that by using one of my improved decoys, together with other conventional decoys, and occasionally operating the duck call from a blind, that wild ducks and geese are more readily attracted than when using only ordinary conventional decoys.

I claim as my invention:

1. A floating duck decoy comprising a buoyant body having therein an air actuated duck call sounding device, manually operated means for supplying air to said sounding device from a distance remote from the floating decoy, and means controlling the sound tone of said duck call sounding device including an air expansion chamber in the duck body interposed, and providing fluid communication, between the air supplying means and the sounding device.

2. A floating duck decoy comprising a buoyant body having therein an air actuated duck call sounding device, means for operating said sounding device from a distance remote from the floating decoy body comprising a long air tube having a hand operated air pump at one end, and having its other end connecting with the buoyant duck body and supplying air to said sounding device, and means controlling the sound tone of said duck call sounding device including an air expansion chamber in the duck body interposed, and providing fluid communication, between the air tube and the sounding device and controlling the effective pressure acting on the sounding device.

3. A floating duck decoy comprising a buoyant body, movable wing elements on said body, means for operating said wing elements including a cylinder and piston located in the duck body, an air tube having an air pump at one end, and having its other end connecting with the cylinder, and supplying air pressure to actuate the piston to move said wing elements, an air expansion chamber in the duck body, means responsive to movement of the piston for transmitting air pressure supplied by the air tube to said expansion chamber, and a duck call sounding device in the duck body communicating with and operated by the air pressure in said expansion chamber.

LEO J. BOUTIN.